United States Patent [19]

Lermuzeaux

[11] Patent Number: 5,351,495
[45] Date of Patent: Oct. 4, 1994

[54] FREEZING PROCESS AND DEVICE

[75] Inventor: André Lermuzeaux, Sucy-En-Brie, France

[73] Assignee: L'Air Liquide, Societe Anonyme Pour L'Etude El L'Exploitation Des Procedes Georges Claude, Paris, France

[21] Appl. No.: 860,417

[22] Filed: Mar. 30, 1992

[30] Foreign Application Priority Data

Jan. 21, 1992 [FR] France ................ 92-00582

[51] Int. Cl.⁵ .............................. F25D 13/06
[52] U.S. Cl. ............................ 62/63; 62/374
[58] Field of Search .......... 62/374, 375, 380, 63

[56] References Cited

U.S. PATENT DOCUMENTS

| | | | |
|---|---|---|---|
| 3,036,440 | 5/1962 | Feinman | 62/375 |
| 3,427,820 | 2/1969 | Hart | 62/307 |
| 3,826,100 | 7/1974 | Vahl | 62/375 |
| 3,832,864 | 9/1974 | Rasovich | 62/374 |
| 3,844,133 | 10/1974 | Bierley et al. | 62/341 |
| 4,186,566 | 2/1980 | Young | 62/57 |
| 4,237,695 | 12/1980 | Oberpriller et al. | 62/375 |
| 4,534,183 | 8/1985 | Hashimoto et al. | 62/374 |
| 4,539,824 | 9/1985 | Kuraoka et al. | 62/63 |
| 4,783,972 | 11/1988 | Tyree, Jr. et al. | 62/374 |
| 4,839,220 | 6/1989 | Stijntjes et al. | 428/258 |

FOREIGN PATENT DOCUMENTS

| | | |
|---|---|---|
| 2808837 | 9/1978 | Fed. Rep. of Germany . |
| 1603509 | 6/1971 | France . |
| 1241061 | 7/1971 | United Kingdom . |
| 2092880 | 8/1982 | United Kingdom . |

*Primary Examiner*—Ronald C. Capossela
*Attorney, Agent, or Firm*—Young & Thompson

[57] ABSTRACT

The invention concerns a process for freezing an article, such as a food according to which said article is contacted with the surface of a porous support which is impregnated with a cryogenic liquid. The invention also concerns a device for freezing an article including a conveyor of porous material, which is insulated by means of an enclosure as well as means for impregnating said conveyor with a cryogenic liquid.

14 Claims, 2 Drawing Sheets

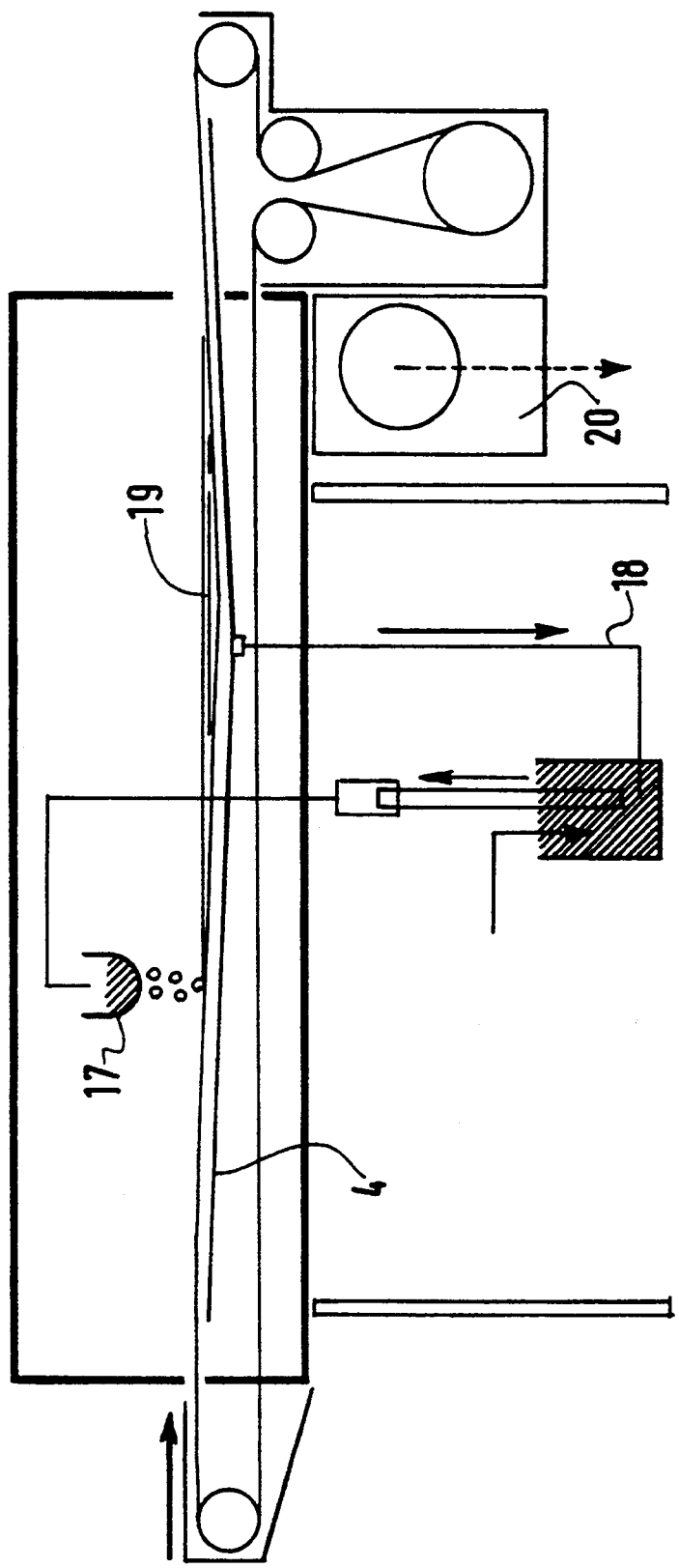

FREEZING PROCESS AND DEVICE

BACKGROUND OF INVENTION (a) Field of the Invention

The present invention concerns a process and a device for freezing articles, such as foods, which are in solid, pasty or liquid form.

(b) Description of Prior Art

The freezing of an article by complete or incomplete immersion in a bath of a cryogenic liquid such as liquid nitrogen, is well known. Thus, patent application GB 2,092,880 describes a process for freezing articles which are liquid, for example blood, or pasty for example butter, yogurt, white cheese or chocolate, according to which the product to be frozen is dropped into a bath of liquid nitrogen and is recovered in the form of solid pellets.

The articles which are introduced into the bath of cryogenic liquid are normally at room temperature or in any case, at a temperature which is much higher than that of the cryogenic liquid.

For this reason, a phenomenon of calefaction takes place. Thus, as soon as they come into contact with the cryogenic liquid, these articles heat the latter at the level of the point of contact, which contributes to convert the cryogenic liquid into gaseous state. This gas forms a layer which surrounds the article and then constitutes a slowing of the heat transfer between the article and the cryogenic liquid. This phenomenon produces a longer heat transfer between the article and the bath of cryogenic liquid and therefore it slows down the freezing of the article. Moreover, heat transfer between the article and cryogenic liquids is not ensured homogeneously, which may cause the frozen articles to be fragile.

Patent application WO 90/06693 describes a process for freezing the surface of an article according to which said article is disposed on the cooled surface of a metallic plate, which is provided with a vibratory movement. The surface of the plate is cooled by passage under the plate of a cryogenic liquid. With this type of process, the article to be frozen is not in direct contact with the cryogenic liquid and therefore does not suffer from the disadvantages mentioned above. However, it has also been observed that this type of process may also result in disadvantages for example during the treatment of pasty products such as balls of mashed vegetables or liquids. Thus, these articles adhere to the surface of the plate until their surface has been sufficiently cooled, which induces a period of latency, delaying the treatment of the articles upstream of the production line. This period of latency therefore results in a sometimes important lowering of productivity.

SUMMARY OF INVENTION

A first object of the present invention then consists in a process for the total or partial freezing of articles by utilizing a cryogenic liquid, thus overcoming the disadvantages of the known processes.

In particular, the process of the invention enables to prevent the phenomenon of calefaction and the formation of a layer of gas around the article, as well as any phenomenon of adhesion between the article being treated and the support on which it is disposed, whether the article is solid, pasty or liquid. Moreover, the process of the invention permits a homogeneous heat transfer between the article and the cryogenic liquid.

Another object of the invention consists in a device for freezing articles enabling to operate the above process.

The present invention therefore concerns a process for freezing an article characterized in that said article is contacted with the surface of a porous support which is impregnated with a cryogenic liquid, after which the article which is at least partially frozen is recovered.

BRIEF DESCRIPTION OF DRAWINGS

Other objects and characteristics of the invention are given in detail in the description which follows as well as in the drawings.

FIG. 2 represents a device according to which the impregnation of the porous support is carried out by streaming down the cryogenic liquid.

DESCRIPTION OF PREFERRED EMBODIMENTS

Figure 1:
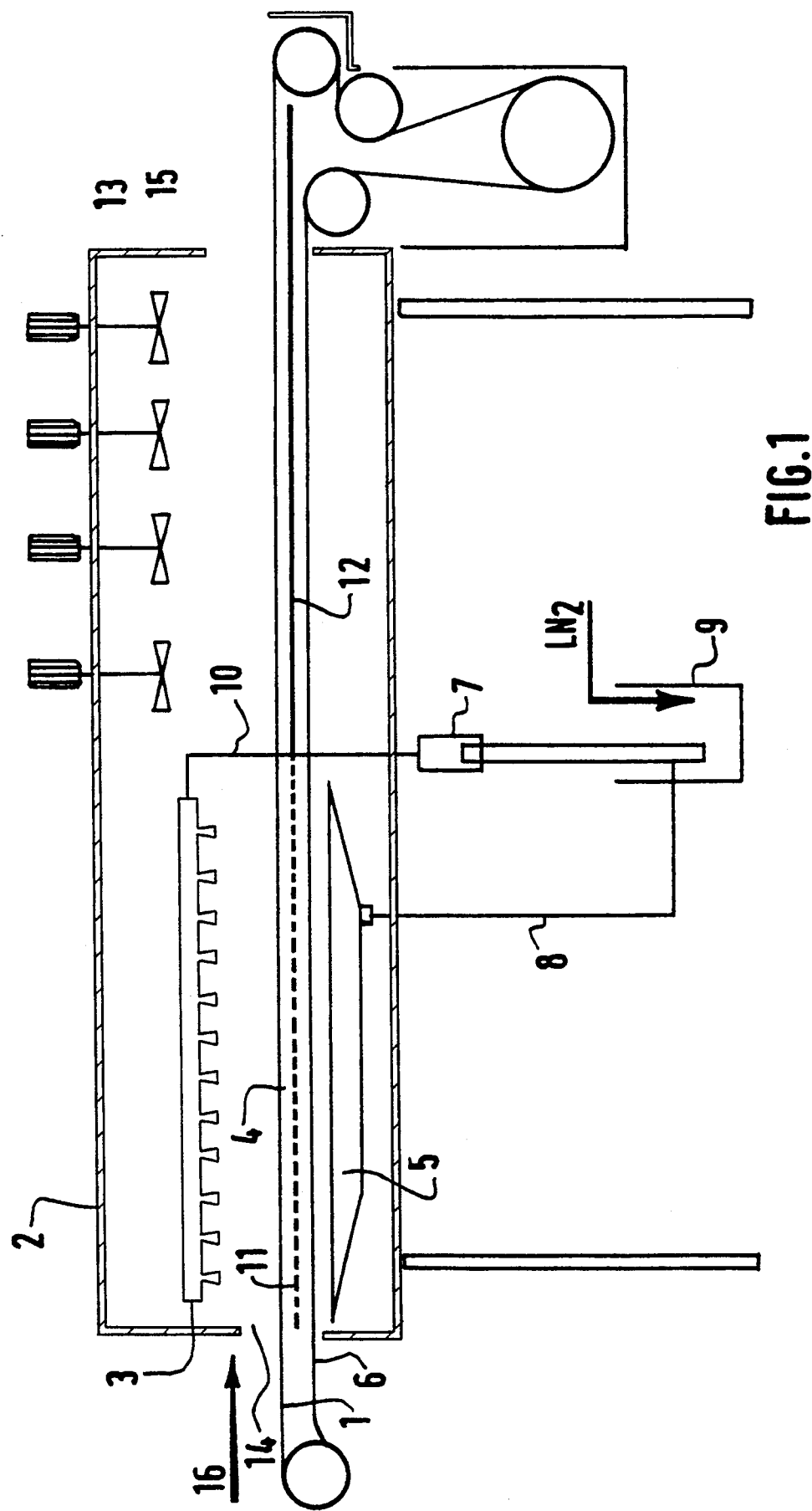
FIG. 1 represents a device according to the invention where the means for impregnation with a cryogenic liquid consist of pulverization nozzles mounted in series.

According to the present invention the porous support may be fixed, but more generally it is movable so as to enable the displacement of the articles which are mounted on its surface.

Normally, the porous support is then in the form of a conveying band or conveyor, which is continuously moved in known manner.

The material of which the porous support is made is preferably flexible and has a low heat of inertia so that its heat equilibrium with the cryogenic liquid is rapidly reached without prohibitive consumption of said cryogenic liquid. The porous support may then be a lattice with fine mesh, which is metallic or made of composite material, such as for example a network of fibers covered with TEFLON.

However, more generally, the porous support is a tissue of synthetic or natural polymer, weaved or unweaved, such as for example an unweaved felt consisting of a tangle of fibers. For some applications, for example for freezing foods, where a careful and easy cleaning is required, the tissue is made of a synthetic polymer, such as a polyamide such as nylon, or preferably a polyester such as those known under the trademarks Tergal, Dacron or Terylene. Advantageously, the tissue is made of monofilaments, whose size may be lower than 1 mm, for example of the order of 0.1 to 1 mm.

The size of the pores of the porous support is preferably sufficiently small so as to retain the cryogenic liquid therein, essentially by capillarity or surface tension.

These pores normally have a diameter between 0.001 and 5 mm, and preferably between 0.01 and 2 mm.

The cryogenic liquid according to the invention is a liquified gas, preferably liquid nitrogen.

The porous support may be impregnated to saturation with a cryogenic liquid. To do this, the support is generally impregnated such that the cryogenic liquid slightly overflows, for example by 1 to 2 mm, above the surface of the porous support.

Of course, it is also possible to impregnate the porous support only partially, so that it contains, for example, only 50 to 80% by weight of the quantity of cryogenic liquid which it can absorb to become saturated.

The content of cryogenic liquid which impregnates the porous support is in fact mainly selected as a function of the quantity of heat that is intended to be transferred to the article, and the thickness of the latter.

Thus, if the article has a thickness higher than about 10 mm and it is intended to freeze only the face in direct contact with the porous support, for example in order to facilitate its later handling, it is possible not to saturate the porous support with cryogenic liquid. On the other hand, if an article of smaller size is intended to be completely frozen, the porous support is saturated with cryogenic liquid.

Depending on the quantity of heat to be transferred and the thickness of the article, the porous support generally contains more than 0.2 kg of cryogenic liquid per kg of porous support, preferably from 0.2 to 1 kg/kg, more preferably from 0.2 to 0.5 kg/kg.

The impregnation of the porous support with cryogenic liquid may be carried out by any known means, for example by immersion of the porous support in a bath of cryogenic liquid, by pulverization, under pressure or in the absence of pressure, of the cryogenic liquid on the porous support by forcing with a pump a flow of cryogenic liquid upwardly passing through the porous support, or by streaming down cryogenic fluid on the porous support.

The articles which may be frozen according to the process of the invention may be of various nature and may be in solid, pasty or liquid form.

The process of the invention is particularly suitable for the freezing of solid or pasty food products such as for example balls of mashed vegetables, slices of meat or fish. The articles to be frozen may be separate from one another, or may be in the form of a continuous band of variable length, for example a band of mashed vegetables or ice cream, intended to be sliced later. The process according to the invention enables for example to crust the face of the article in direct contact with the porous support. By the term "crust", is meant here the freezing of at least one of the faces of the article in order to facilitate its ulterior handling.

In addition to the crusting of the face of the article in contact with the porous support, it is possible, simultaneously or not, to easily crust at least one of the other faces of the article, for example by pulverizing or streaming down some cryogenic liquid on the article. This pulverization or streaming is advantageously the one which is also used in order to impregnate the porous support with cryogenic liquid.

The articles to be frozen are disposed on the porous support which is cooled at a temperature in the vicinity of the temperature of the cryogenic liquid. At this stage, the porous support may already be impregnated with cryogenic liquid or it can be impregnated later.

As soon as the porous support is impregnated with cryogenic liquid, the latter is vaporized and prevents all adhesion of the article to the porous support. Moreover, even when the article is liquid, such as water, it does not wet the cryogenic liquid impregnated porous support. Heat transfer between the porous support impregnated with cryogenic liquid and the article is perfectly carried out without the phenomenon of calefaction taking place, in spite of the vaporization of the cryogenic liquid.

The invention also concerns a device for freezing articles characterized in that it comprises a conveyor 1 of porous material which is insulated by means of an enclosure 2, as well as means for impregnating 3 said conveyor 1 with cryogenic liquid.

Conveyor 1 may advantageously be a roller conveyor which is operated in known manner by means of a motor.

The length of the conveyor depends on the amount of heat that is intended to be transferred to the article. However, generally, it is between 1 and 15 m.

The width and thickness of conveyor 1 are not critical. They are mainly selected as a function of the dimensions and number of articles that are intended to be frozen per unit of time.

Generally, the thickness of conveyor 1 is between 1 and 20 mm, preferably between 1 and 10 mm. The surface of conveyor 1 which is in contact with the articles to be frozen is generally horizontal, but it may also have a descending or rising slope, or it may alternately be descending or rising. The surface of conveyor 1 may even be vertical or nearly vertical as long as contact between the surface of the conveyor and the articles is ensured.

In particular when the articles to be frozen are relatively heavy and could impede the good operation of conveyor 1, the latter may be supported along all or part of its length, on which the articles are disposed, by means of a rigid supporting plate 4, preferably made of metal such as aluminum or stainless steel.

Supporting plate 4, on the surface of which the conveyor moves, may be full and/or in the form of lattice. The device according to the invention may also include means for recovering excess cryogenic liquid which flows through the pores of conveyor 1. These recovery means include a trough 5 normally disposed under the conveyor, preferably at a level where conveyor 1 is impregnated with cryogenic liquid.

When conveyor 1 is supported by means of supporting plate 4, the latter is in the form of lattice or is perforated, at least on the part located above trough 5, so as to permit the passage of the cryogenic liquid towards said trough 5. The latter may then be located either above this lattice part of supporting plate 4 or either below return band 6 of conveyor 1, which itself is located under supporting plate 4 such that the cryogenic liquid escapes through conveyor 1, passes through supporting plate 4 and return band 6 of conveyor 1 and finally is collected in trough 5.

According to another embodiment, supporting plate 4 itself constitutes a trough for recovering cryogenic liquid. It may then be slightly incurvated. In addition to trough 5, said recovery means also include a device enabling to send the excess of cryogenic liquid towards the means for impregnation 3 with cryogenic liquid. This device normally includes a pump 7. The means of impregnation 3 are also supplied with a cryogenic liquid by means of a storage container to which they are connected.

These means of impregnation may consist of pulverization nozzles, an immersion vat filled with cryogenic liquid and traversed by the conveyor, a trough from which glides the cryogenic liquid or a pump which pushes cryogenic liquid under the conveyor through which the liquid passes in upward direction.

FIG. 1 represents a device according to the invention where conveyor 1 made of a porous material is operated by means of a roller system.

Conveyor 1 is insulated along its entire length by means of a sealed enclosure 2 including only two openings, enabling the inlet 14 and the outlet 15 of the articles.

The means of impregnation 3 with cryogenic liquid are here made of pulverization nozzles mounted in series, disposed above conveyor 1.

The part of conveyor 1 carrying the articles is horizontal and is supported by means of a supporting plate 4 of which the portion located at the level of the pulverization nozzles is formed as a lattice 11, the other portion of the plate being full 12.

Under the lattice portion 11 of supporting plate 4 there is disposed a trough 5 such that return band 6 of the conveyor may circulate between said supporting plate 4 and said trough 5. The trough 5 is connected by means of a duct 8 to a storage container 9 into which the excess of cryogenic liquid is poured. The storage container 9 is also connected to a reservoir of cryogenic liquid (not illustrated) and is provided with a pump 7, which, by means of a duct 10 feeds the pulverization nozzles 3 disposed in series, with cryogenic liquid.

The temperature of the atmosphere inside the enclosure is made homogeneous by means of ventilators 13.

For freezing articles by means of the device of FIG. 1, as a first step, conveyor 1 which is in operation is cooled down. This cooling is ensured by pulverization of cryogenic liquid through nozzles 3. Then, the articles to be frozen are manually or automatically disposed on conveyor 1 at the level of the inlet of the enclosure. The articles are moved in the direction of arrow 16. Conveyor 1 is then again impregnated with cryogenic liquid by means of nozzles 3.

According to the present device, the nozzles 3 are disposed such that the cryogenic liquid is dispersed along the entire width of conveyor 1. Thus, the articles which pass underneath the nozzles, are crusted at the level of their lower face by contact with conveyor 1 which is impregnated with the cryogenic liquid, and also on their other faces, by means of pulverized cryogenic liquid. If it is intended to crust only the face of the articles in contact with conveyor 1, it is possible to dispose the pulverization nozzles 3 such that the cryogenic liquid impregnates conveyor 1 without previously touching the articles.

To do this, nozzles 3 may for example be disposed above one or the two lateral edges of conveyor 1 while the articles roll along its central part. Conveyor 1 may however be impregnated with cryogenic liquid on its entire width, by capillarity. The cryogenic liquid in excess passes through conveyor 1, then through the lattice portion 11 of supporting plate 4, and impregnates return band 6 of conveyor 1, such that the articles disposed on said conveyor 1 at the level of the inlet 14 of enclosure 2, are immediately contacted with a porous support impregnated with a cryogenic liquid.

Possibly, the excess of cryogenic liquid which passes through said return band 6 is recovered in trough 5. This cryogenic liquid then passes in storage container 9 and is sent back towards the pulverization nozzles 3 by means of pump 7 simultaneously as the complimentary cryogenic liquid from the reservoir, which enables to compensate for losses of vaporized cryogenic liquid. The crusted or frozen articles are recovered at the outlet 15 of enclosure 2 without difficulty so long as they do not at all adhere to the conveyor 1.

FIG. 2 represents a variant of the device of the invention where the means of impregnation with cryogenic liquid consist of a trough 17 from which flows down, by streaming, a flow of cryogenic liquid.

Conveyor 1 has two parts, one with a descending slope and the other with a rising slope, so that it is slightly incurvated in its central portion.

Supporting plate 4 is full and also incurvated so as to follow the path of conveyor 1. It constitutes by itself the trough for the recovery of the excess of cryogenic liquid and is connected, through a duct 17, to storage container 9. Because the conveyor is slightly incurvated, its central portion defines a bath of cryogenic liquid of small height, for example 1 to 2 mm, through which the articles pass. The device also includes a system of ventilation 20 enabling to evacuate from enclosure 2 the vaporized cryogenic liquid.

The cryogenic liquid streaming down from trough 17 falls on the articles which move with conveyor 1, but is not sufficient for crusting same. Thus, the device of FIG. 2 is more particularly intended to crust only the face of the articles in contact with conveyor 1 and possibly, the lower part of the articles in contact with the bath of cryogenic liquid 19.

The examples given hereinbelow illustrate the present invention.

EXAMPLE 1

In order to crust iced logs which are continuously extruded, the device illustrated in FIG. 1 is used.

Conveyor 1 is a cloth which is weaved with a polyester monofilament weighing 0.99 kg/m$^2$. The pores of the cloth have an average diameter of 0.37 mm. This cloth is cooled from 20° C. to about $-196$° C. by pulverizing 0.72 kg liquid nitrogen/kg of cloth or 0.88 l of liquid nitrogen/m$^2$ of cloth.

The weight of liquid nitrogen held by capillarity in the saturated cloth is 0.3 kg/m$^2$.

The cloth is 0.40 m wide. The articles travel a distance of 4 m long in contact with the cloth.

The iced logs are 100 mm long, 90 mm thick and weigh 750 g.

When they penetrate into enclosure 2, their temperature is $-5$° C. When they are crusted, their temperature is $-6$° C.

The logs are disposed on conveyor 1 behind one another.

Liquid nitrogen is pulverized through nozzles 3 under a pressure of 1.5 bar. It is thus possible to crust 25 logs per minute with a consumption of liquid nitrogen of 0.3 l/kg of logs.

EXAMPLE 2

By means of the same device as that of example 1, quenelles weighing 60 g (10 cm long and 20 mm diameter) have been crusted. At the inlet of the enclosure, the quenelles are at 15° C. and they exit while crusted at a temperature of $-3$° C.

It was thus possible to treat 3 tons/hour of these quenelles with a consumption of liquid nitrogen of 0.64 l/kg.

EXAMPLE 3

The device of FIG. 1 is used except that it includes a conveyor 1 made of a cloth of monofilament of polyester having the following characteristics:
Weight of the cloth by m$^2$: 0.590 kg
Diameter of pores: 0.12 mm
Liquid nitrogen pulverized to cool the cloth from $+20$° to $-196$° C.: 0.71 kg/kg, or 0.5 l/m$^2$ of cloth
Weight of nitrogen held by capillarity of the cloth: 0.25 kg/m$^2$ The other characteristics of the device are the same as those of the device of examples 1 and 2.

With this device, meat slices 104 mm diameter and 12 mm thick for a weight of 100 g were crusted on both their faces.

Two slices of meat are disposed in line on a width of at most 380 mm and a length of 140 mm for four slices. At the inlet of enclosure 2, the temperature of the meat slices is −1° C. At the outlet of the enclosure, their temperature is −2° C.

It was thus possible to treat 800 kg of meat for a consumption of liquid nitrogen of 0.5 l/kg.

We claim:

1. Process for freezing an article which comprises:
   a) contacting said article with a surface of a porous support which has been previously impregnated with a cryogenic liquid, said porous support being made of one of synthetic and natural polymer, said porous support having pores sufficiently small so as to retain the cryogenic liquid therein,
   b) ensuring heat transfer between the cryogenic liquid impregnated within the porous support and the article, and
   c) recovering the at least partially frozen article.

2. Process according to claim 1, wherein the porous support is movable.

3. Process according to claim 1, wherein the porous support is made of a tissue of a synthetic polymer.

4. Process according to claim 3, wherein said porous support is made of a tissue of polyester.

5. Process according to claim 3, wherein the porous support is made of a synthetic polymer tissue consisting of monofilaments.

6. Process according to claim 1, wherein the porous support has pores whose diameter is between 0.001 and 5 mm.

7. Process according to claim 1, wherein the porous support retains the cryogenic liquid by capillarity or surface tension.

8. Process according to claim 1, wherein the cryogenic liquid is a liquid nitrogen.

9. Process according to claim 1, wherein the porous support is impregnated with cryogenic liquid by passage through a bath of cryogenic liquid.

10. Process according to claim 1, wherein the article is crusted on its face in direct contact with the porous support.

11. Process according to claim 10, wherein the article is crusted in at least another of its faces by impregnation with cryogenic liquid.

12. Process according to claim 1, wherein the article is one of a liquid food, a pasty food and a solid food.

13. Process according to claim 1, wherein the porous support is impregnated to saturation with a cryogenic liquid.

14. Process according to claim 1, wherein the porous support is impregnated with cryogenic liquid so that it contains 50 to 80% by weight of the quantity of cryogenic liquid it can adsorb to become saturated.

* * * * *